United States Patent
Hino et al.

(10) Patent No.: US 7,215,034 B2
(45) Date of Patent: May 8, 2007

(54) POWER SUPPLY SYSTEM FOR VEHICLE

(75) Inventors: Noriaki Hino, Mito (JP); Shinichi Fujino, Mito (JP); Hiroshi Kanazawa, Hitachiota (JP); Toshiyuki Innami, Mito (JP); Takashi Kobayashi, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 3 days.

(21) Appl. No.: 11/195,604

(22) Filed: Aug. 3, 2005

(65) Prior Publication Data

US 2006/0038406 A1    Feb. 23, 2006

(30) Foreign Application Priority Data

Aug. 20, 2004 (JP) .............................. 2004-240347

(51) Int. Cl.
*F02D 20/06* (2006.01)
(52) U.S. Cl. ................ 290/40 C; 290/40 B; 290/40 A; 180/65.1; 180/65.2; 701/22
(58) Field of Classification Search ............. 290/40 C, 290/49 A, 40 B; 180/65.1, 65.2, 65.3; 701/22
See application file for complete search history.

(56) References Cited

U.S. PATENT DOCUMENTS

| | | | | |
|---|---|---|---|---|
| 5,703,410 A | * | 12/1997 | Maekawa ................. | 290/40 C |
| 5,841,201 A | * | 11/1998 | Tabata et al. ............. | 290/40 C |
| 6,181,020 B1 | * | 1/2001 | Uchida et al. ............ | 290/40 C |
| 6,441,506 B2 | * | 8/2002 | Nakashima ............... | 290/40 C |
| 6,455,978 B1 | * | 9/2002 | Krefta et al. ............. | 310/263 |
| 6,470,983 B1 | * | 10/2002 | Amano et al. ............ | 180/65.2 |
| 6,570,266 B1 | * | 5/2003 | Wakashiro et al. ....... | 290/40 C |
| 6,659,213 B2 | * | 12/2003 | Kubo et al. .............. | 180/65.4 |
| 6,672,415 B1 | * | 1/2004 | Tabata ..................... | 180/65.2 |
| 6,700,213 B1 | * | 3/2004 | Wakashiro et al. ....... | 290/40 C |
| 6,707,169 B2 | * | 3/2004 | Shimizu et al. .......... | 290/40 C |
| 6,891,279 B2 | * | 5/2005 | Kazama ................... | 290/40 C |

FOREIGN PATENT DOCUMENTS

| | | |
|---|---|---|
| JP | 11-299123 | 10/1999 |
| JP | 11-318064 | 11/1999 |
| JP | 2001-028832 | 1/2001 |
| JP | 2001-103721 | 4/2001 |
| JP | 2002-262530 | 9/2002 |
| JP | 2003-018793 | 1/2003 |

* cited by examiner

*Primary Examiner*—Darren Schuberg
*Assistant Examiner*—Iraj A. Mohandesi
(74) *Attorney, Agent, or Firm*—Crowell & Moring LLP

(57) ABSTRACT

An A.C. generator has a rotor that is equipped with a permanent magnet and a field coil. The output of the A.C. generator charges the high-voltage battery. Voltage of the high-voltage battery is stepped-down by a DC/DC converter and supplied to the low-voltage battery. When the motor controller detects that the field coil has not been energized, the higher-rank controller switches so as to generate power by means of the permanent magnet of the A.C. generator and charge the low-voltage battery. This mechanism enables power to be generated when a circuit malfunctions.

Thereby, a power supply system for vehicle can generate power when a circuit malfunctions so that the driver on the vehicle can drive the vehicle to a repair shop.

12 Claims, 14 Drawing Sheets

POWER SUPPLY SYSTEM FOR VEHICLE

CLAIM OF PRIORITY

The present application claims priority from Japanese application serial no. 2004-240347, filed on Aug. 20, 2004, the content of which is hereby incorporated by reference into this application.

FIELD OF THE INVENTION

The present invention relates to a power supply system for vehicle, specifically relates to a power supply system that can operate when a generator for automobile is abnormally functioning.

BACKGROUND OF THE INVENTION

Recently, as the electrical components for an automobile increases, electric power generated only by a conventional 12-V low-voltage battery is not sufficient as the power supply on the automobile. Accordingly, a power supply system for vehicle has been proposed that is equipped with two battery systems: a 12-V low-voltage battery and a 36-V high-voltage battery. For example, as disclosed in Japanese Patent Laid-open No. 2001-28832, in a well-known power supply system for vehicle, a low-voltage battery and a high-voltage battery are electrically connected to each other via a DC/DC converter, and the generator normally charges the 36-V battery and then charges the 12-V battery via the DC/DC converter. Furthermore, for example, as disclosed in Japanese Patent Laid-open No. Hei 11 (1999)-299123, in a well-known power supply system for vehicle, a spare battery is provided as a precaution when the regulating circuit that controls direct current supplied to the field coil of the A.C. generator malfunctions, and if the malfunction occurs, the spare system starts to generate electric power so that the vehicle can continue traveling.

SUMMARY OF THE INVENTION

However, there is a problem in that installation of a spare system increases cost, which is not practical. On the other hand, if the spare system is not provided, there is a problem in that electric power cannot be generated when the field circuit of the A.C. generator for automobile stays open, and the vehicle must stop.

The object of the present invention is to provide a power supply system for vehicle which is capable of generating electric power when a circuit malfunction occurs, thereby making it possible for the driver to drive the vehicle to a repair shop.

(1) To achieve the above object, the present invention comprises:

an A.C. generator having a rotor equipped with a permanent magnet and a field coil;

a high-voltage battery that has an electrical connection with the A.C. generator and is charged by the A.C generator;

a low-voltage battery the voltage of which is lower than that of said high-voltage battery;

a DC/DC converter that steps down the voltage of said high-voltage battery and supplies the lowered voltage to said low-voltage battery; and a control means for charging said low-voltage battery with the electric power generated through said permanent magnet in said A.C. generator when said field coil is not energized.

This configuration enables power generation when a malfunction occurs in the circuit.

(2) In the above item 1, it is preferable that said A.C. generator comprise a claw-pole type rotor, and the permanent magnets located between the claws of a pair of rotor yokes opposite each other.

(3) In the above item 1, it is preferable that said A.C. generator comprise a claw-pole type rotor, and the permanent magnets located at the base of claws of rotor yoke.

(4) In the above item 2 or 3, it is preferable that the area S1 of the rotor yoke winded said field coil is smaller than the area S3 of the base of the claws of said rotor yoke (S1<S3).

(5) In the above item 1, when said field coil is not energized, it is preferable that said control means reduces the gear ratio of the transmission that changes the rotational driving force generated by an engine which drives said A.C. generator, and revs up the engine.

(6) In the above item 1, it is preferable that said A.C. generator comprises an alternative field coil to which electric power is supplied from said low-voltage battery, and said control means charges said low-voltage battery with the electric power generated through said permanent magnet and said alternative field coil in said A.C. generator when said field coil is not energized.

(7) Furthermore, to achieve the above object, the present invention comprises:

an A.C. generator having a rotor equipped with a field coil and an alternative field coil;

a high-voltage battery that has an electrical connection with the A.C. generator and is charged by the generator;

a low-voltage battery the voltage of which is lower than that of said high-voltage battery;

a DC/DC converter that steps down the voltage of said high-voltage battery and supplies the lowered voltage to said low-voltage battery; and a control means for charging said low-voltage battery with the electric power generated through said alternative field coil in said A.C. generator when said field coil is not energized.

This configuration enables power generation when a malfunction occurs in the circuit.

(8) Furthermore, to achieve the above object, the present invention comprises:

an A.C. generator having a rotor equipped with a permanent magnet and a field coil;

a voltage step-up means which steps up output voltage of the A.C. generator;

a low-voltage battery which is charged with the voltage stepped up by said voltage step-up means; and a control means for charging said low-voltage battery with the electric power generated through said permanent magnet in said A.C. generator when said field coil is not energized.

This configuration enables power generation when a circuit malfunction occurs.

(9) In the above item 8, it is preferable that said voltage step-up means is a DC/DC converter.

(10) In the above item 8, it is preferable that said voltage step-up means is a power circuit which commutates the output voltage of said A.C. generator.

According to the preferred embodiment of the present invention, electric power can be generated when a malfunction occurs in the circuit, thereby making it possible for the driver to drive the vehicle to a repair shop.

DESCRIPTION OF THE PREFERRED EMBODIMENTS

With reference to FIGS. 1 through 7, configuration of a power supply system for vehicle according to a first embodiment of the present invention will be explained.

First, by using FIG. 1, configuration of a vehicle which incorporates a power supply system for vehicle according to this embodiment will be explained.

Figure 1:
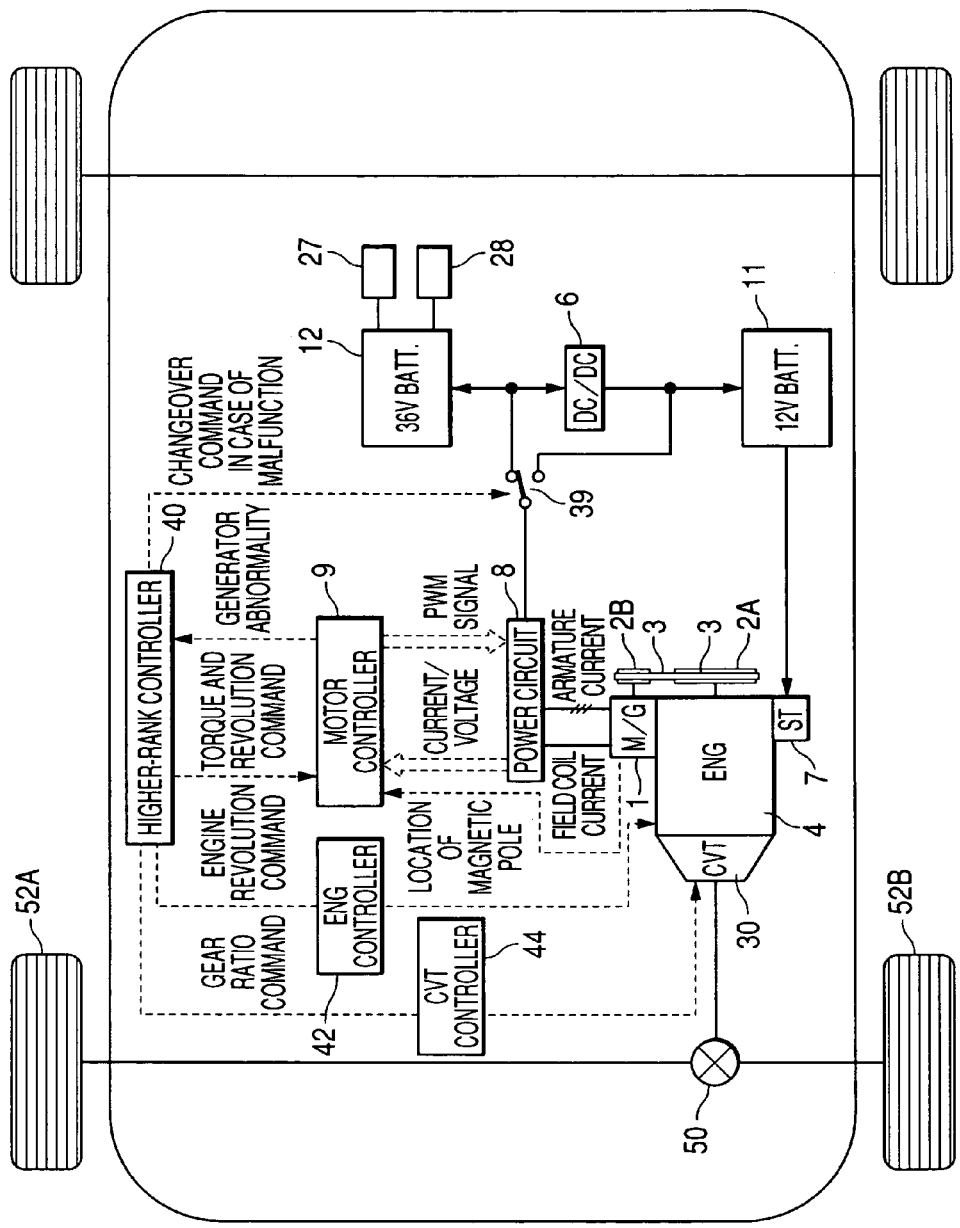
FIG. 1 is a block diagram that shows configuration of a vehicle which incorporates a power supply system for vehicle according to a first embodiment of the present invention.

FIG. 1 is a block diagram that shows configuration of a vehicle which incorporates a power supply system for vehicle according to a first embodiment of the present invention.

Rotation speed of an engine 4 is changed by a CVT 30 and transmitted to wheels 52A and 52B via a differential gear 50, thereby running the vehicle. An engine controller 42 controls fuel injection and ignition timing for the engine 4 according to an engine revolution command issued by the higher-rank controller 40. The CVT 30 is controlled by a CVT controller 44 according to a transmission gear ratio command sent by the higher-rank controller 40.

Rotation of the engine 4 is transmitted to a motor generator 1 via a pulley 2A, belt 3, and a pulley 2B. The motor generator (M/G) 1 is controlled by a motor controller 9 via a power circuit 8. At this point, the motor generator 1 switches as a generator under the control of the motor controller and converts rotational energy of the engine 4 into A.C. power. A power circuit 8, such as an inverter, converts A.C. power generated by the generator 1 into direct-current power and charges the 36-V high-voltage battery 12. In normal operation, the higher-rank controller 40 switches a switch 29 to connect the power circuit 8 to the 36-V high-voltage battery 12.

The feature of this system is that idling is performed by an installed large-capacity 36-V battery 12 thereby. When an engine resumes operating after idling, the motor generator 1 is operated as a motor thereby supplying electric power from a high-voltage battery 12 to a power circuit 8. Then, the power circuit 8 drives the motor generator 1, which makes power running as a motor. The motor controller 9 switches the functions: power generation and power running.

In this embodiment, both the 12-V low-voltage battery 11 and the 36-V high-voltage battery 12 are used as a power supply system for a vehicle, and the voltage of the 36-V battery is converted into 12 V by a voltage step-down type DC/DC converter 6 thereby charging the 12-V low-voltage battery 11. The 12-V low-voltage battery 11 supplies electric power to most of an automobile's electrical components that perform the basic functions for making an automobile run, such as an engine starter (ST) 7, and controllers that include a higher-rank controller 40, motor controller 9, engine controller 42, and an SVT controller 44. The 36-V high-voltage battery 12 supplies electric power to accompanying functions, such as a hot start after idling, motor power steering 27, and audio apparatus 28, which require a large amount of electric power, but are not required to run the vehicle, and the vehicle can run without those accompanying functions.

The motor generator 1 is used as a starter for idling, and another engine starter 7 is separately provided for the initial startup. This is because when starting an engine in a condition in which oil and everything inside the automobile is cold (cold start), necessary starting torque is extremely large, approximately 60 Nm. Accordingly, a normal starter 7 is a direct-current machine having a special brush to momentarily supply large torque at low-speed rotation, and there is a problem with the life of the brush when the machine is frequently used to perform idling for the purpose of fuel efficiency. On the other hand, when starting an engine after the engine has become warm (hot start), necessary starting torque is relatively small, 20 to 40 Nm. Therefore, it is possible for the motor generator 1 to receive high energy from a high-voltage battery 12 and operate as a motor thereby executing a hot start. Furthermore, the motor generator 1 is designed to operate continuously, and there is no problem with its life. Moreover, because a generator, which is an integral automobile component, is used as a motor, the increased cost will be slight. It is clear that if the generator 1 can generate higher output, for example, starting torque of nearly 60 Nm that is required for a cold start, it is not necessary to provide a starter 7.

The feature of the power supply system for vehicle according to this embodiment is the use of a brush-less A.C. generator having a permanent magnet as a motor generator 1. Configuration of the motor generator 1 will be described later in this document with reference to FIG. 3. And, the feature is the increased reliability of the entire power supply system for vehicle by focusing the function in which the use of the A.C. generator having a permanent magnet enables a certain degree of voltage to be generated by means of only the permanent magnet's leakage flux without the generator's field coil current. In conventional automobile systems, if a malfunction occurs in a generator causing field coil current to stop flowing, the generator is not capable of generating voltage thereby making it impossible to charge a battery. As a result, the automobile stops running.

On the contrary, in this embodiment, a permanent magnet is provided in the magnetic field of the generator so that the leakage flux enables voltage to be generated when an abnormality occurs causing field coil current to stop flowing. However, it is difficult for only the leakage flux to generate high voltage, and therefore, it is difficult to charge a high-voltage battery. Accordingly, when the motor controller 9 judges that an abnormality has occurred, the higher-rank controller 40 switches the switch 29 to the low-voltage battery 11 side so that low voltage generated by means of the magnet's leakage flux can charge the low-voltage 12-V battery 11. This configuration that uses an A.C. generator equipped with a permanent magnet makes it possible for the vehicle to travel when a circuit malfunction occurs. Although the amount of power generated by the leakage flux is only 20% of the total power generated, the amount of power generated is sufficient enough to charge the 12-V low-voltage battery 11 thereby enabling the automobile to travel.

In normal operation, the motor generator 1 charges the 36-V high-voltage battery 12, and also receives energy from the 36-V high-voltage battery 12 so as to resume engine operation after idling and assist engine torque. When brake is applied, the motor generator 1 regenerates energy and charges the high-voltage battery 12. The 12-V low-voltage battery 11 is charged with the lowered voltage which is obtained by stepping-down the voltage of the high-voltage battery 12 by a DC/DC converter 6. When an abnormality occurs causing field coil current to stop flowing, the motor generator 1 charges only the 12-V low-voltage battery 11. The 12-V low-voltage battery 11 supplies electric power to most of an automobile's electrical components that function to run the automobile. Therefore, when an abnormality occurs, electric power generated by the 12-V low-voltage battery 11 enables the vehicle to continue traveling.

The motor controller 9 sends a PWM signal to the power circuit (inverter) 8 and conversely, monitors current and voltage. Especially, the motor controller 9 monitors whether the command value of field coil current matches the actual current, and if field coil current does not flow as indicated by the command value, the motor controller 9 judges that the generator has an abnormality and notifies the higher-rank controller 40 that an abnormality exists. When an abnormality occurs, the higher-rank controller 40 switches the switch 29 which disconnects the 36-V battery and connects directly to the 12-V battery. If voltage generated by the generator due to the permanent magnet's leakage flux is more than 12 V and less than 36 V, it is possible to continuously charge the 12-V battery. This configuration makes it possible to at least continuously charge the 12-V battery when the generator malfunctions causing current to stop flowing through the field coil. Because only the 12-V battery supplies minimum power to the vehicle so that it can run, the vehicle can continue traveling when an abnormality occurs. As a result, the driver can drive the vehicle to a repair shop.

Next, with reference to FIG. 2, configuration of an electrical circuit of a power supply system for vehicle according to this embodiment will be explained.

Figure 2:
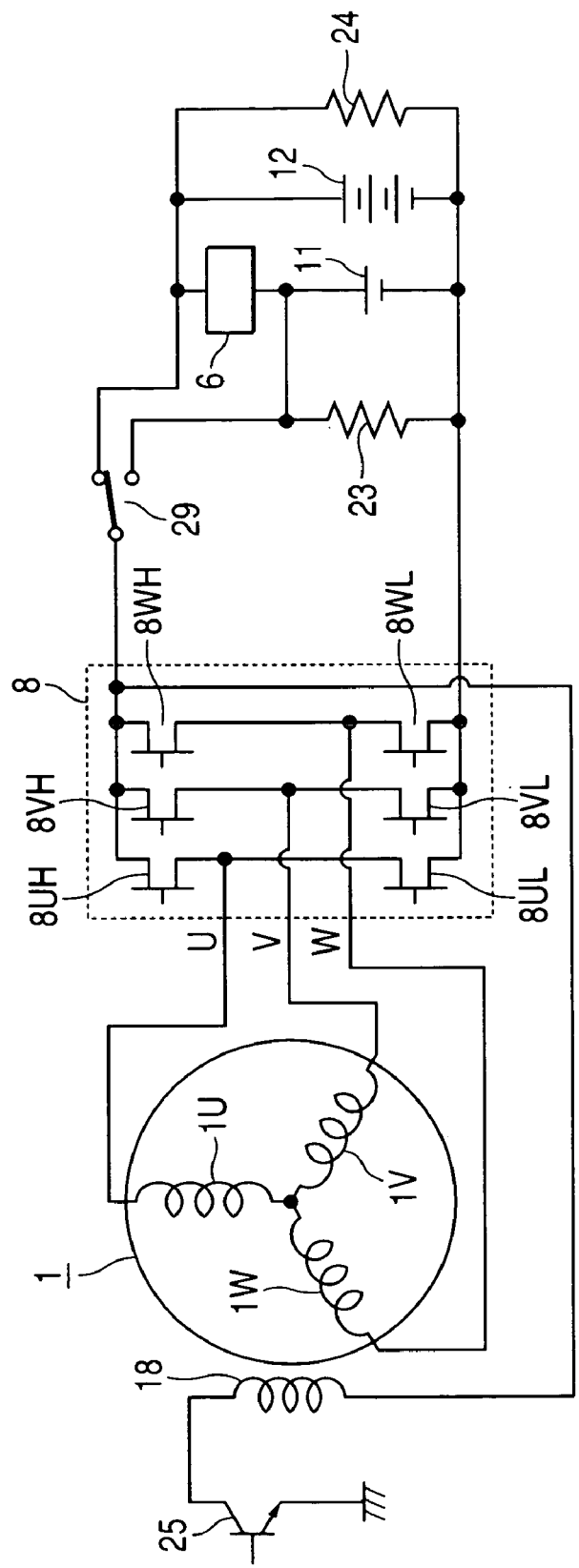
FIG. 2 is a circuit diagram that shows configuration of the electrical circuit of a power supply system for vehicle according to a first embodiment of the present invention.

FIG. 2 is a circuit diagram which shows configuration of an electrical circuit of a power supply system for vehicle according to a first embodiment of the present invention. Items are identical to those in FIG. 1 when the same alphanumeric characters are assigned.

A motor generator 1 is equipped with three-phase (U-phase, V-phase, and W-phase) armature coils 1U, 1V and 1W, and a field coil 18. The field coil 18 variably controls current by means of a switching element 25, thereby regulating the amount of magnetic flux of the motor generator 1 and controlling generating power and torque.

The power circuit 8 comprises six MOS-FETs 8UH, 8UL, 8VH, 8VL, 8WH and 8WL: two MOS-FETs for each of three phases (U-phase, V-phase, and W-phase); and MOS-FETs of each phase are connected in series. The power circuit 8 switches as an inverter when driving a motor generator 1 that is functioning as a motor, and switches as a rectifier when driving the motor generator 1 that is functioning as a generator. In the power generating mode, the higher-rank controller 40 shown in FIG. 1 issues a negative torque command to the motor controller 9, and the motor controller 9 controls the power circuit 8 that is functioning as a rectifier. In the power running mode, the higher-rank controller 40 issues a positive torque command and the motor controller 9 controls the power circuit 8 that is functioning as an inverter. To adjust output torque, the motor controller 9 controls the switching element 25, thereby controlling field coil current that flows through the field coil 18. Furthermore, performing the vector control of the motor's d-axis and q-axis makes it possible to achieve a wider range of motor output characteristic or highly efficient motor characteristic. Vector control is a method to change the motor's current phase and the location of the magnetic field's magnetic pole thereby driving a motor under optimal driving conditions. By doing so, the motor's output characteristic increases. As a consequence, it is possible to assist the engine by providing motor torque at the time the generator resumes operating after idling and when engine revolutions are high.

An abnormality that causes current to stop flowing through the field coil 18 occurs mainly due to a failure of the switching element 25. When the switching element 25 stays open, current does not flow through the field coil. Therefore, power cannot be generated by the generator without a permanent magnet. However, as shown in this embodiment, the use of a generator with a permanent magnet makes it possible to provide a minimum amount of generated power necessary for the vehicle to continue traveling by using the permanent magnet's leakage flux.

Next, with reference to FIGS. 3 through 6, configuration of a motor generator 1 used in a power supply system for vehicle according to this embodiment.

Figure 3:
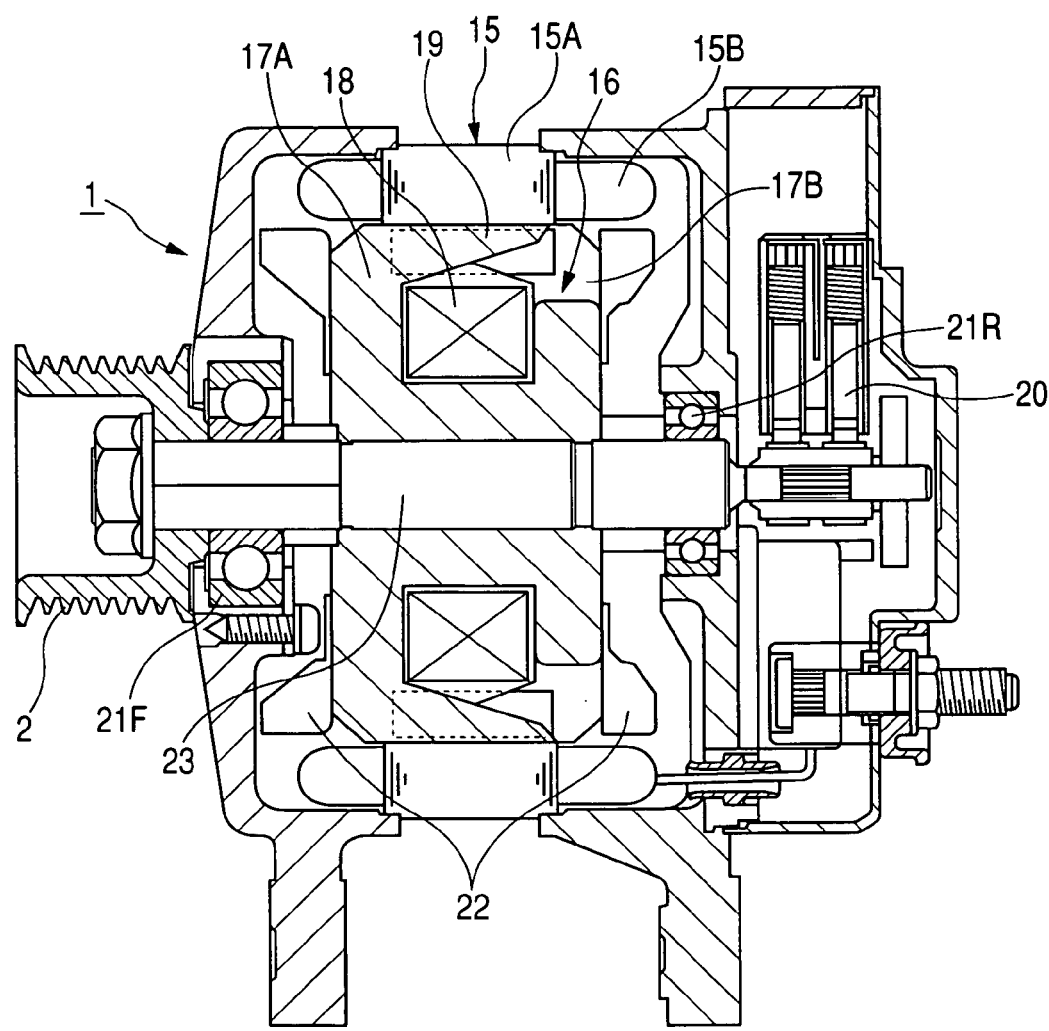
FIG. 3 is a sectional view that shows configuration of a motor generator used in a power supply system for vehicle according to a first embodiment of the present invention.

First of all, with reference to FIG. 3, the entire configuration of the motor generator 1 used in the power supply system for vehicle according to this embodiment.

FIG. 3 is a sectional view that shows configuration of a motor generator used in the power supply system for vehicle according to a first embodiment of the present invention. Items are identical to those in FIG. 1 when the same alphanumeric characters are assigned.

The motor generator 1 is equipped with a stator 15 and a rotor 16. The stator 15 comprises a core 15A and a stator coil 15B. The rotor 16 comprises a pair of rotor yokes 17A and 17B, a field coil 18, and a permanent magnet 19. A cooling fin 22 is attached to the rotor yokes 17A and 17B so as to provide ventilation to the inside of the generator at the time of rotation thereby increasing cooling efficiency.

The field coil 18, which is surrounded by rotor yokes 17A and 17B, supplies direct current to the field coil 18 via a slip ring 20, thereby exciting the rotor 16. Rotation and driving of a pulley 2 by an engine rotates the shaft 23 of the rotor 16, and rotation of the excited rotor 16 induces voltage to the stator coil 15B, thereby generated current flows. Furthermore, in a generator system of this embodiment, a permanent magnet 19 located between the rotor yokes 17A and 17B enables voltage to be generated by using only leakage flux of the permanent magnet 19 when current stops flowing through the field coil 18.

Furthermore, current that flows through the stator coil 15B rotates the rotor 16, and rotation of the pulley 2 allows the motor generator to be used as a motor for resuming engine operation.

Next, with reference to FIGS. 4 and 5, configuration of the rotor yoke of the motor generator 1 used in a power supply system for vehicle according to this embodiment will be explained.

Figure 4:
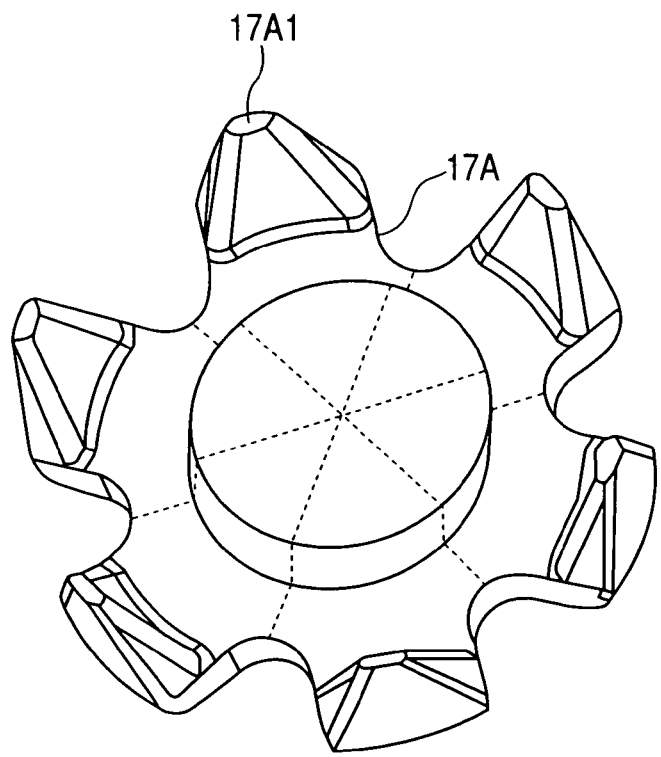
FIG. 4 is a perspective view that shows configuration of one of two rotor yokes of the claw-pole type motor generator used in a power supply system for vehicle according to a first embodiment of the present invention.
Figure 5:
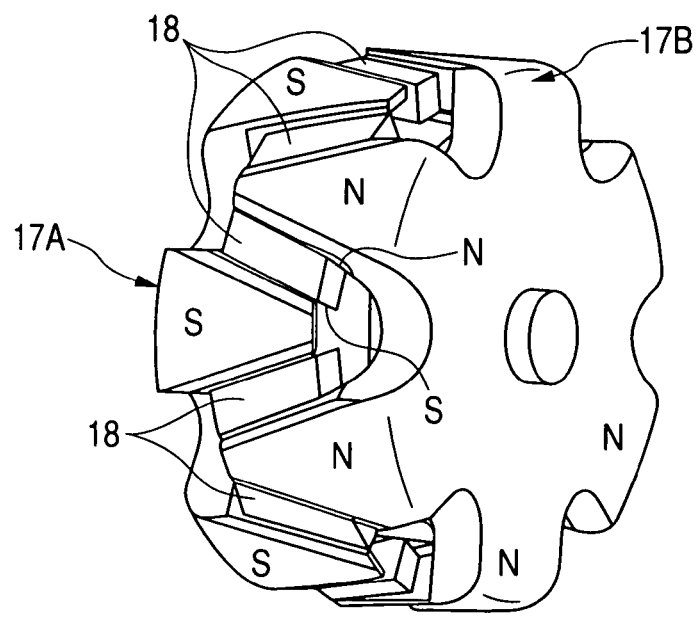
FIG. 5 is a perspective view that shows configuration in which a permanent magnet is located between a pair of rotor yokes of the motor generator used in a power supply system for vehicle according to a first embodiment of the present invention.

FIG. 4 is a perspective view that shows configuration of one of two rotor yokes of the claw-pole type motor generator used in a power supply system for vehicle according to a first embodiment of the present invention. FIG. 5 is a perspective view that shows configuration in which a permanent magnet is located between a pair of rotor yokes of the motor generator used in a power supply system for vehicle according to a first embodiment of the present invention. Items are identical to those in FIG. 3 when the same alphanumeric characters are assigned.

FIG. 4 shows the shape of one rotor yoke 17A of a pair of rotor yokes 17A and 17B. As shown in the figure, the rotor yoke 17A has six claw magnetic poles 17A1. And, as shown in FIG. 5, this is a claw-pole type motor generator's rotor yoke in which claw magnetic poles of the pair of rotor yokes 17A and 17B are combined by being positioned at slightly different locations, and a solenoid field coil which is wound in the inside of the claw magnetic pole is energized, thereby generating a magnetic field in the claw magnetic pole. Herein, one claw is excited as the N-pole and the other claw is excited as the S-pole.

Because this claw magnetic pole rotor combines rotor yokes within a single body, it is possible to ensure strength that counteracts the centrifugal force during high-speed rotation. Therefore, a generator with a high rotational speed of 18,000 rpm can be achieved. To design this generator, it is necessary to provide a certain degree of thickness at the base to prevent the claws from spreading due to the centrifugal force.

Among magnetic fluxes caused by the rotor's magnetic field, magnetic fluxes that go to the rotor become effective magnetic fluxes. However, magnetic fluxes leak into the clearance between the claws' magnetic poles, causing a closed magnetic circuit to form inside the rotor. As a result, the magnetomotive force of the rotor's field coil is wasted. To improve this situation, altogether six permanent magnets 18 are individually placed between claws' magnetic poles. As shown in FIG. 5, the magnetic direction of N to S of the magnet 18 is opposite of the magnetic pole formed on the claw by the field coil. The permanent magnet's magnetic flux rebounds the claw magnetic pole's magnetic flux, thereby making it easy for the magnetic flux to go out to the surface of the claw magnetic pole. In this manner, since the permanent magnet 19 is subject to a strong magnetic field in a direction opposite to magnetic attraction on exciting the field coil, the permanent magnet 19 is made of a sintered neodium magnet with high residual flux density and high coercive force in order to prevent the loss of magnetic attraction resulting from demagnetization.

Next, with reference to FIG. 6, detailed configuration of the rotor yoke of the motor generator 1 used in a power supply system for vehicle according to this embodiment will be explained.

Figure 6A:
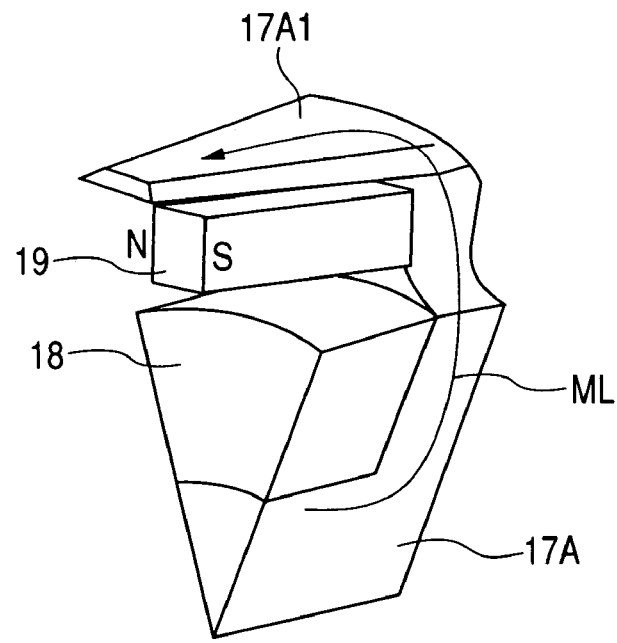
FIG. 6 is a perspective view that shows detailed configuration of the rotor yoke of the motor generator used in a power supply system for vehicle according to a first embodiment of the present invention.
Figure 6B:
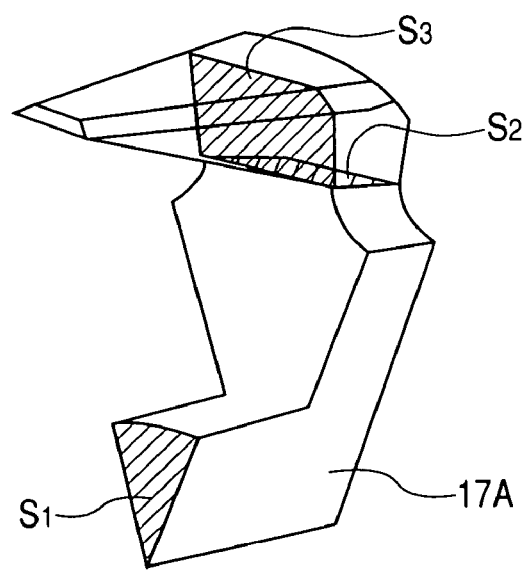

FIG. 6 is a perspective view that shows detailed configuration of the rotor yoke of the motor generator 1 used in a power supply system for vehicle according to a first embodiment of the present invention. Items are identical to those in FIG. 3 when the same alphanumeric characters are assigned.

In this embodiment, the rotor yoke 17 is characteristically shaped so as to effectively use the magnet's leakage flux. FIG. 6 shows in detail the relationship between the rotor yoke 17A and the claw magnetic pole 17A1 of one portion when the rotor yoke 17 is divided into six portions along the broken line shown in FIG. 4.

The rotor's magnetomotive force supplies a magnetomotive force from the field coil 18, and the magnetic flux flows in the direction shown by the arrow ML. In the rotor with a claw magnetic pole having no magnets, magnetic fluxes leak to the outside by degrees, and as a result become less on the claw surface away from the coil bobbin. Therefore, the cross-sectional area of the magnetic circuit of the claw is normally small. The area of S1 where a field coil is wound is the largest, and the area of S3 at the base of the claw is slightly smaller. As shown in an example of FIG. 6, the areas are S1>S2>S3.

However, in a generator with a magnet according to this embodiment, a permanent magnet 19 also generates magnetic fluxes. Accordingly, if the area of S1 is large, the permanent magnet's magnetic flux short-circuits, thereby preventing effective magnetic fluxes from reaching the stator. Therefore, by making the area of S1 at the center of the field coil 18 small and magnetically saturating S1 with the permanent magnet's magnetic flux, the permanent magnet's magnetic fluxes can leak to the stator side. Therefore, in this embodiment, the areas are S1<S2, S3. Herein, if the area of S2 is narrower, a machine's inability to counteract the centrifugal force becomes insufficient and the claw spreads as previously stated. Since it is practically difficult to decrease the area of S2 in the design, only S1 is made small in this embodiment.

Next, with reference to FIG. 7, another configuration of the rotor yoke used in the motor generator 1 of a power supply system for vehicle according to this embodiment will be explained.→

Figure 7A:
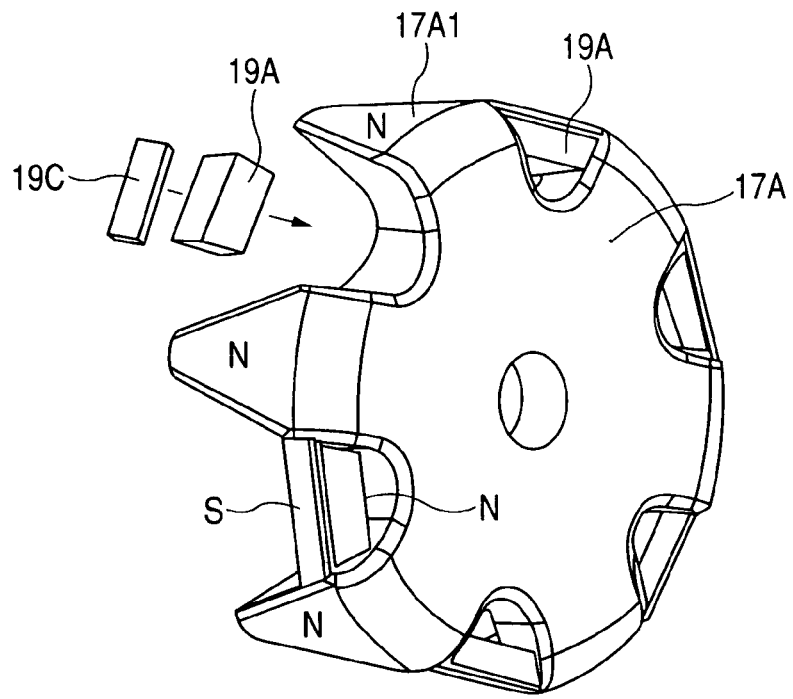
FIG. 7 is a perspective view that shows detailed configuration of the rotor yoke of the motor generator used in a power supply system for vehicle according to a first embodiment of the present invention.
Figure 7B:
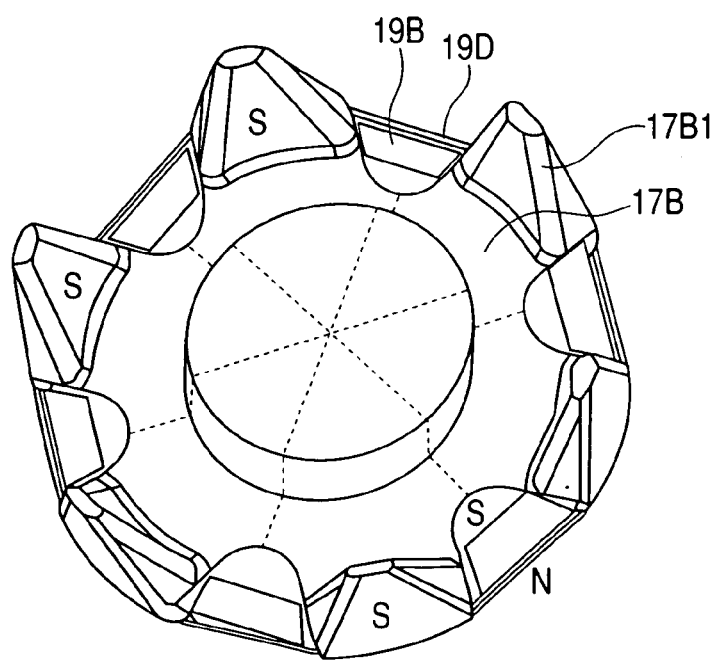

FIG. 7 is a perspective view that shows detailed configuration of the rotor yoke used in the motor generator 1 of a power supply system for vehicle according to a first embodiment of the present invention. FIG. 7(A) shows one of the rotor yokes 17A and FIG. 7(B) shows the other rotor yoke 17B. Items are identical to those in FIG. 3 when the same alphanumeric characters are assigned.

As shown in FIG. 7(A), a permanent magnet 19A is located at the base of the claw magnetic pole 17A1 that is adjacent to the rotor yoke 17A. After the permanent magnet 19A has been installed, the magnet 19A is supported by the fixing plate 19C. As shown in FIG. 7(B), a permanent magnet 19B is also located at the base of the claw magnetic pole 17B1 that is adjacent to the rotor yoke 17B. Therefore, the number of permanent magnets 19A and 19B is twelve, and therefore, it is possible to further increase leakage fluxes by the quantity of those permanent magnets. Accordingly, it is possible to increase the amount of power generated only by permanent magnets.

As stated above, according to this embodiment, when the generator malfunctions causing current to stop flowing through the field coil, it is possible to at least continuously charge the 12-V battery. Since only the 12-V battery at least supplies minimum power required for a vehicle to continue traveling, the vehicle can run when an abnormality occurs, thereby making it possible for the driver to drive the vehicle to a repair shop.

Next, with reference to FIGS. 8 through 10, configuration of a power supply system for vehicle which uses a vehicle generator according to a second embodiment of the present invention will be explained.

First, by using FIG. 8, configuration of the major part of the vehicle that incorporates a power supply system for vehicle according to this embodiment will be explained.

Figure 8:
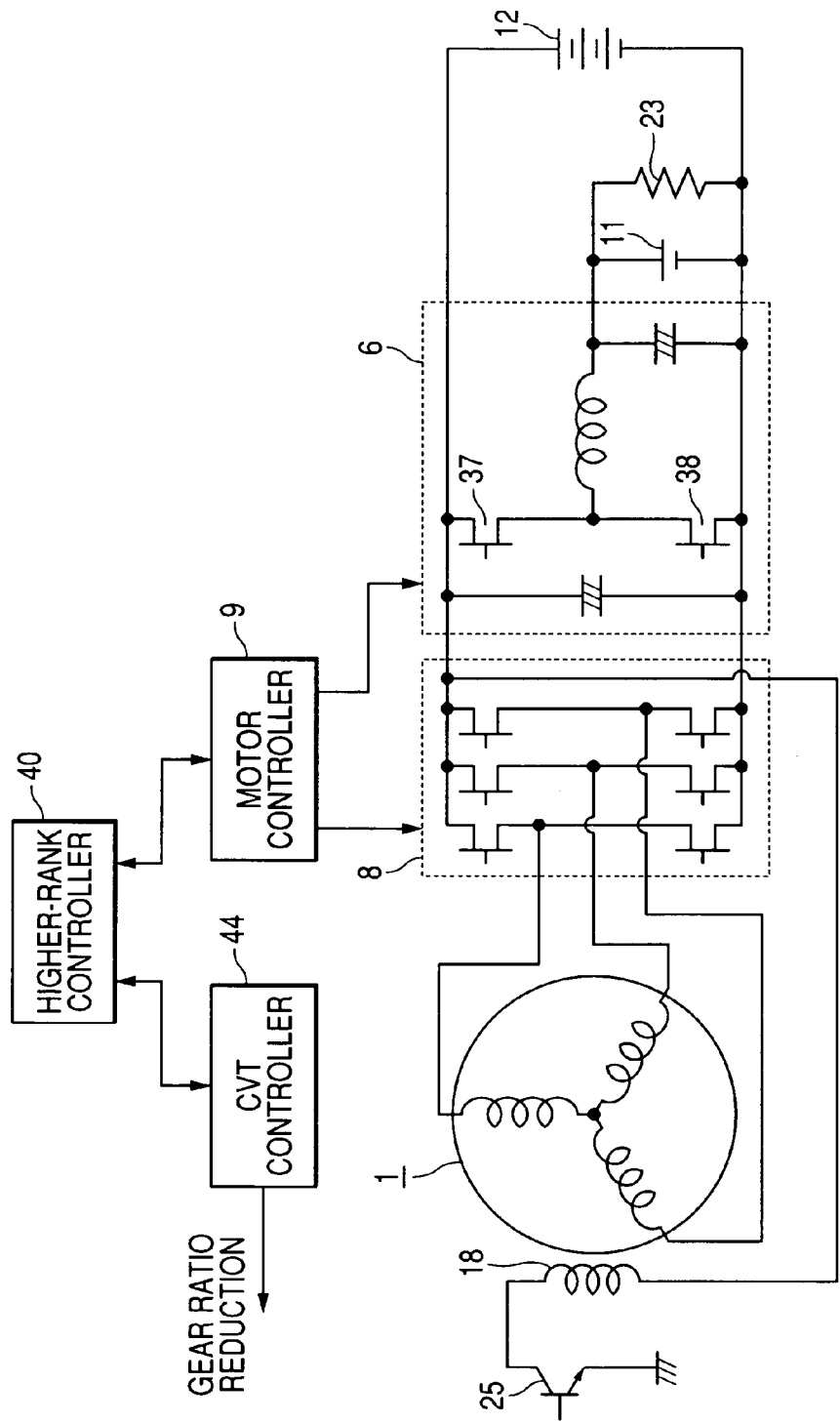
FIG. 8 is a block diagram that shows configuration of the major part of the vehicle that incorporates a power supply system for vehicle according to a second embodiment of the present invention.

FIG. 8 is a block diagram that shows configuration of the major part of the vehicle that incorporates a power supply system for vehicle according to a second embodiment of the present invention. The same numbers and symbols shown in FIG. 1 indicate the same parts.

The configuration of the power supply circuit according to this embodiment is different from that of FIG. 4; it does not use a changeover switch. If an abnormality occurs causing field coil current to stop flowing, the higher-rank controller 40 detects the abnormality and issues a command to the continuous and variable transmission unit CVT controller 44 to reduce the transmission gear ratio and maintain high engine revolutions in order to keep vehicle speed constant. The CVT controller 44 will then reduce the transmission gear ratio. When field coil current does not flow, induced voltage generated only by the magnet's leakage flux is low. However, by reducing the transmission gear ratio to increase the number of engine revolutions, it is possible to increase the number of revolutions of the motor generator 1, thereby increasing the generated voltage. Moreover, if the transmission is a common automatic transmission, a command is issued to shift the transmission down one gear. Furthermore, in the case of a manual transmission vehicle, the driver is warned so that the driver maintains the number of revolutions by down shifting one gear. This mechanism enables power to be generated only by leakage fluxes.

Furthermore, both the high-voltage side MOS-FET 37 and the low-voltage side MOS-FET 38 of the DC/DC converter 6 are usually turned off, thereby charging the high-voltage battery 12. However, when an abnormality occurs causing field coil current to stop flowing, the motor controller 9 detects the abnormality, turns off the field coil current command and the motor torque command, and switches to the simple power generating mode. By turning off the gate signal of the MOS-FET that makes up a power circuit 8, the MOS-FET functions as a diode, which is the same configuration as that of a common automobile generator. By turning on the high-voltage side MOS-FET 37, the low-voltage battery 11 can be charged by means of voltage generated by the generator 1.

Next, with reference to FIGS. 9 and 10, operations of a power supply system for vehicle according to this embodiment will be explained.

Figure 9:
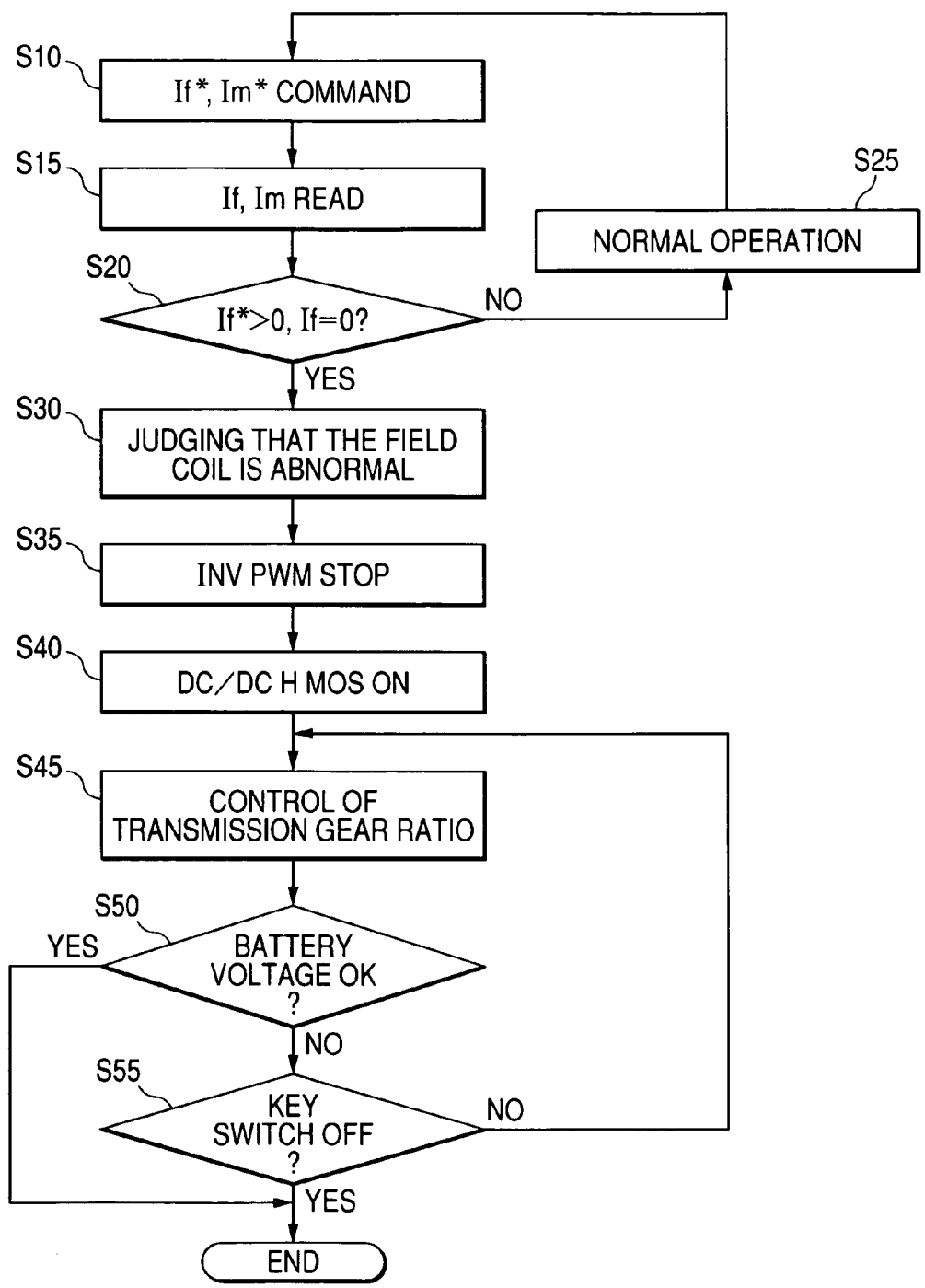
FIG. 9 is a flow chart that shows the operations of a power supply system for vehicle according to a second embodiment of the present invention.

FIG. 9 is a flow chart that shows the operations of a power supply system for vehicle according to a second embodiment of the present invention. FIG. 10 is a timing chart that shows the operations of a power supply system for vehicle according to a second embodiment of the present invention.

In step S10 of FIG. 9, the higher-rank controller 40 issues field coil current If* and monitor current Im* commands to the motor controller 9; and in step S15, the higher-rank controller 40 reads actual values If and Im obtained by the motor controller 9. Next, in step S20, the higher-rank controller 40 judges whether the command value If* of the field coil current is more than zero and whether the actual field coil current If has stopped flowing. When these conditions are satisfied, the higher-rank controller 40 judges that an abnormality exists, and then enters into the emergency power generating mode in step S30 and later. If these conditions are not met, the higher-rank controller 40 judges that the operation status is normal, and executes normal operation in step S25.

Herein, by using FIG. 10, normal operations will be explained. Time is plotted along the horizontal axis in FIG. 10. The amount of generated power is plotted along the vertical axis in FIG. 10(A), FIG. 10(B) shows the remaining 12-V low-voltage battery, and FIG. 10(C) shows the abnormal signal of the field coil. FIG. 10(D) shows field coil current If, FIG. 10(E) shows field coil current command If*, and FIG. 10(F) shows motor torque command. FIG. 10(G) shows a transmission gear ratio, FIG. 10(H) shows the number of engine revolutions, and FIG. 10(I) shows vehicle speed. FIG. 10(J) shows the amount of depressed accelerator pedal, and FIG. 10(K) shows the ON/OFF condition of the key switch.

When a driver turns the key switch on at time t1 (FIG. 10(K)), the 12-V starter activates an engine and performs idling at time t2 (FIG. 10(H)). At a cold start, remaining energy of the 12-V battery decreases because energy is drained from the battery (FIG. 10(B)). As the engine starts idling, field coil current If runs according to the generator's field coil current command If* (FIG. 10(E), (D)), and power generation starts (FIG. 10(A)). At this point, the motor controller outputs a negative torque command which is opposite of the generator's rotation direction (FIG. 10(F)).

Next, at time t3, the driver depresses the accelerator (FIG. 10(J)), and when the automobile accelerates, the number of engine revolutions increases and the vehicle's speed also increases (FIG. 10(I), (H)). At the same time, the CVT's transmission gear ratio gradually increases (FIG. 10(G)), and the vehicle speed increases while suppressing the number of engine revolutions (FIG. 10(H), (I)). At this point, the motor controller issues a positive torque command (FIG. 10(F)), and the motor generator 1 functions as a motor, thereby assisting the acceleration of the vehicle. Because this energy is received by the 36-V battery, the amount of generating power becomes negative (FIG. 10(A)). Because the torque necessary for the assistance is larger than the torque necessary for power generation, field coil current If increases (FIG. 10(D)).

Next, at time t4, the vehicle speed reaches the speed that the driver desires, and when the constant speed is maintained (FIG. 10(I)), the transmission gear ratio increases (FIG. 10(G)), the number of engine revolutions decreases (FIG. 10(H)), and the number of engine revolutions, vehicle speed, and the transmission gear ratio become constant. Because the generator receives energy from the engine, the torque command becomes negative (FIG. 10(F)). Next, at time t5, when the driver eases the accelerator to reduce speed (FIG. 10(J)), and depresses the brake, the number of engine revolutions and the CVT's transmission gear ratio decrease in reverse procedural order from those during acceleration (FIG. 10(H), (G)). When the vehicle stops at time t6, it returns to the idling condition. At the time of deceleration, the generator increases a negative torque command and applies the regenerative brake. Regenerated energy is provided to charge the 36-V battery.

At time t6, the vehicle stops but the engine is still idling and normally generating power. At time t6, when the idling time reaches a certain time, the engine operation is stopped to save fuel (FIG. 10(H)). At this point, electric power is supplied to the vehicle's electrical components from the 36-V battery via the 12-V battery. If the 36-V battery does not have sufficient remaining battery charge, idling will not be conducted. Because power cannot be generated when an engine stops, field coil current and motor torque command become zero (FIG. 10(E), (D), (F)).

Next, at time t8, at a hot start in which the driver wishes to resume operation after idling, by depressing the accelerator (FIG. 10(J)), the motor accelerates the vehicle. Current flows through the magnetic field to generate motor torque (FIG. 10(D)). Then, an engine resumes operation (FIG. 10(H)), and engine torque and motor torque accelerate the vehicle (FIG. 10(I)). This is the normal operating condition.

Herein, at time t10, it is assumed that the semiconductor switch that controls field coil current becomes open, and therefore, the field coil has discontinued.

When judgment of YES is made in step S20 of FIG. 9, in step S30, the motor controller 9 detects an abnormality of the field coil, and outputs an abnormal signal to the higher-rank controller 40 (FIG. 10(C)).

When an abnormality is detected, the operation mode becomes an emergency mode at time t13, and in step S35, the higher-rank controller 40 turns off the field coil current command and the motor torque command (FIG. 10(E), (F)), and the motor controller 9 stops the PWM signal of the power circuit 6. Next, in step S40, the motor controller 9 turns on the DC/DC converter's high-voltage side MOS-FET 37, and switches a battery to be charged from the 36-V high-voltage battery to the 12-V low-voltage battery.

Figure 10:
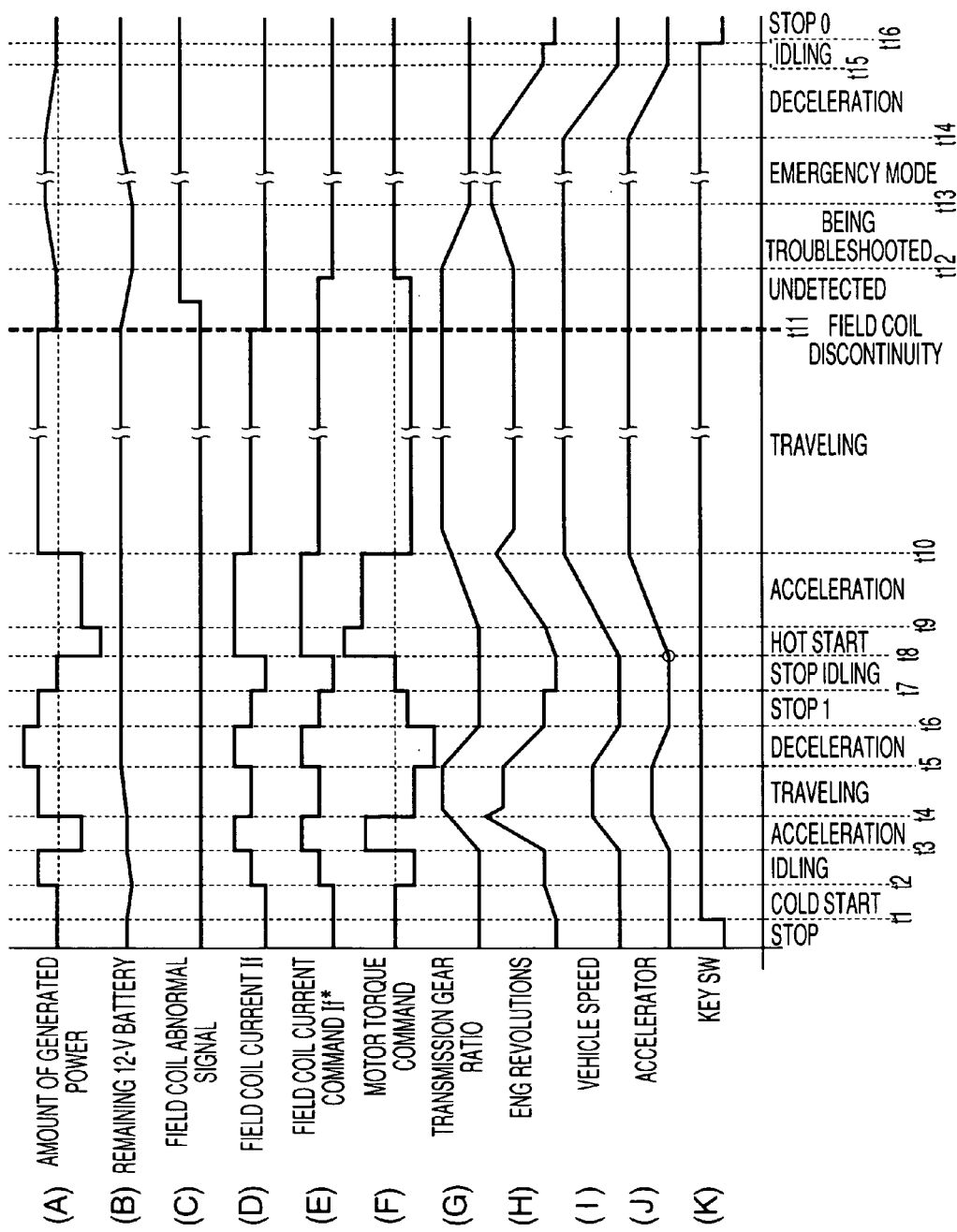
FIG. 10 is a timing chart that shows the operations of a power supply system for vehicle according to a second embodiment of the present invention.

Next, in step S45, the higher-rank controller 40 increases the number of engine revolutions so as to increase voltage of the generator while keeping the vehicle speed constant and also decreases the CVT's transmission gear ratio (FIG. 10 (H), (G)) to generate power so that the battery voltage will not decrease. The number of engine revolutions and the transmission gear ratio are changed according to vehicle speed, and power generation is always made possible. Design of the generator beforehand regulates leakage fluxes so that voltage of the generator exceeds battery voltage at a certain number of revolutions. Adjustment of leakage fluxes can be made by increasing or decreasing the side area of the permanent magnet that faces a claw magnetic pole.

Herein, the amount of generated power and the number of revolutions will be specifically explained. For example, the range of the engine rotation speed is from 600 rpm to 6,000 rpm, and the number of normal revolutions is approximately 2,000 rpm. Because the pulley ratio of an engine to the generator is approximately 2:3, the number of generator revolutions is from 1,200 to 18,000 rpm, and the number of normal revolutions is from 4,000 to 6,000 rpm. Minimum electric power necessary for an automobile to continuously travel is approximately 400 W. Therefore, it may be sufficient if the amount of leakage flux is regulated so that the 12-V battery is charged with approximately 400 W when the generator rotates at approximately 5,000 rpm, that is, an electric current of 30 A is generated.

Furthermore, in step S50, the amount of remaining 12-V low-voltage battery is detected, and if the remaining battery is low, the emergency mode is stopped. In step S55, the ON/OFF condition of the key switch is detected, and if the switch is turned on, the procedure returns to step S45 and the emergency mode continues.

After the vehicle maintains the emergency mode that allows the vehicle to travel and the driver drives the vehicle to a repair shop, the engine starts to decelerate at time t14, perform idling at time t15, and the engine stops at time t16.

As previously stated, according to this embodiment, when the generator malfunctions causing current to stop flowing through the field coil, at least the 12-V battery is continuously charged. Since only the 12-V battery at least supplies minimum power that enables the vehicle to continue traveling, the vehicle can travel if an abnormality occurs and the driver can drive the vehicle to a repair shop.

Next, with reference to FIG. 11, configuration of a power supply system for vehicle which uses a vehicle generator according to a third embodiment of the present invention will be explained.

Figure 11:
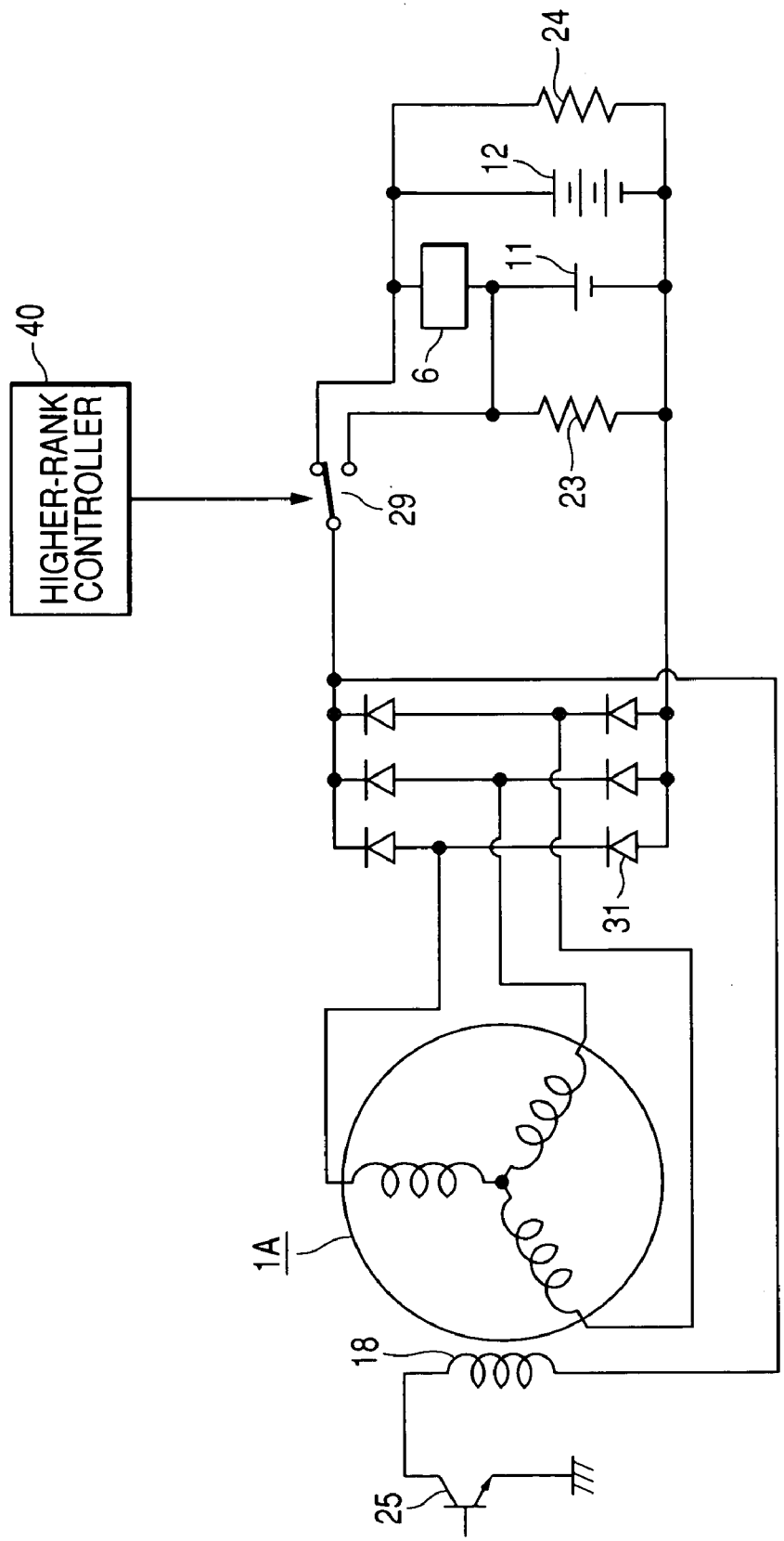
FIG. 11 is a block diagram that shows configuration of a power supply system for vehicle according to a third embodiment of the present invention.

FIG. 11 is a block diagram that shows configuration of a power supply system for vehicle according to a third embodiment of the present invention. Items are identical to those in FIGS. 1 and 2 when the same alphanumeric characters are assigned.

This embodiment is different from those shown in FIGS. 1 and 2 in that this embodiment uses a commutating circuit which comprises six diodes 31 instead of using a power circuit which comprises MOS-FETs shown in FIG. 2. In this embodiment, since the generator 1A is not used as a motor, it is a simple high-voltage generator. Two power supply systems, 36 V and 12 V, are provided, and the higher-rank controller 40 switches the switch 29 so that the generator 1 charges the high-voltage side 36-V battery 11 during normal operation. The generator 1A generates higher voltage than the 36-V battery, thereby charging the battery.

If a switching element 25 that controls field coil current malfunctions in the open state, because a generator with a magnet is used as a generator 1A, the permanent magnet's leakage flux will generate voltage.

In this embodiment, to use a generator 1A for high voltage so as to normally generate voltage of more than 36 V, even if magnetic flux of the 12-V generator is the same as that of the magnetic field, the number of stator's turns is greater so that induced voltage is higher than that of the 12-V generator. Therefore, even if the magnet's leakage flux is weak, it is possible to make induced voltage higher than the 12-V battery voltage.

When an abnormality occurs causing field coil current to stop flowing, by disconnecting the 36-V battery by means of the switch 29, it is possible for the voltage generated by the generator 1 to charge the 12-V low-voltage battery 11. When the DC/DC converter 6 is a voltage step-down type converter from 36V to 12V, the converter stops operating.

As described in a second embodiment, when an abnormality occurs, the number of engine revolutions can be increased.

As previously stated, according to this embodiment, when the generator malfunctions causing current to stop flowing through the field coil, at least the 12-V battery is continuously charged. Since only the 12-V battery at least supplies minimum power that enables the vehicle to continue traveling, the vehicle can travel if an abnormality occurs and the driver can drive the vehicle to a repair shop.

Next, with reference to FIG. 12, configuration of a power supply system for vehicle which uses a vehicle generator according to a fourth embodiment of the present invention will be explained.

Figure 12:
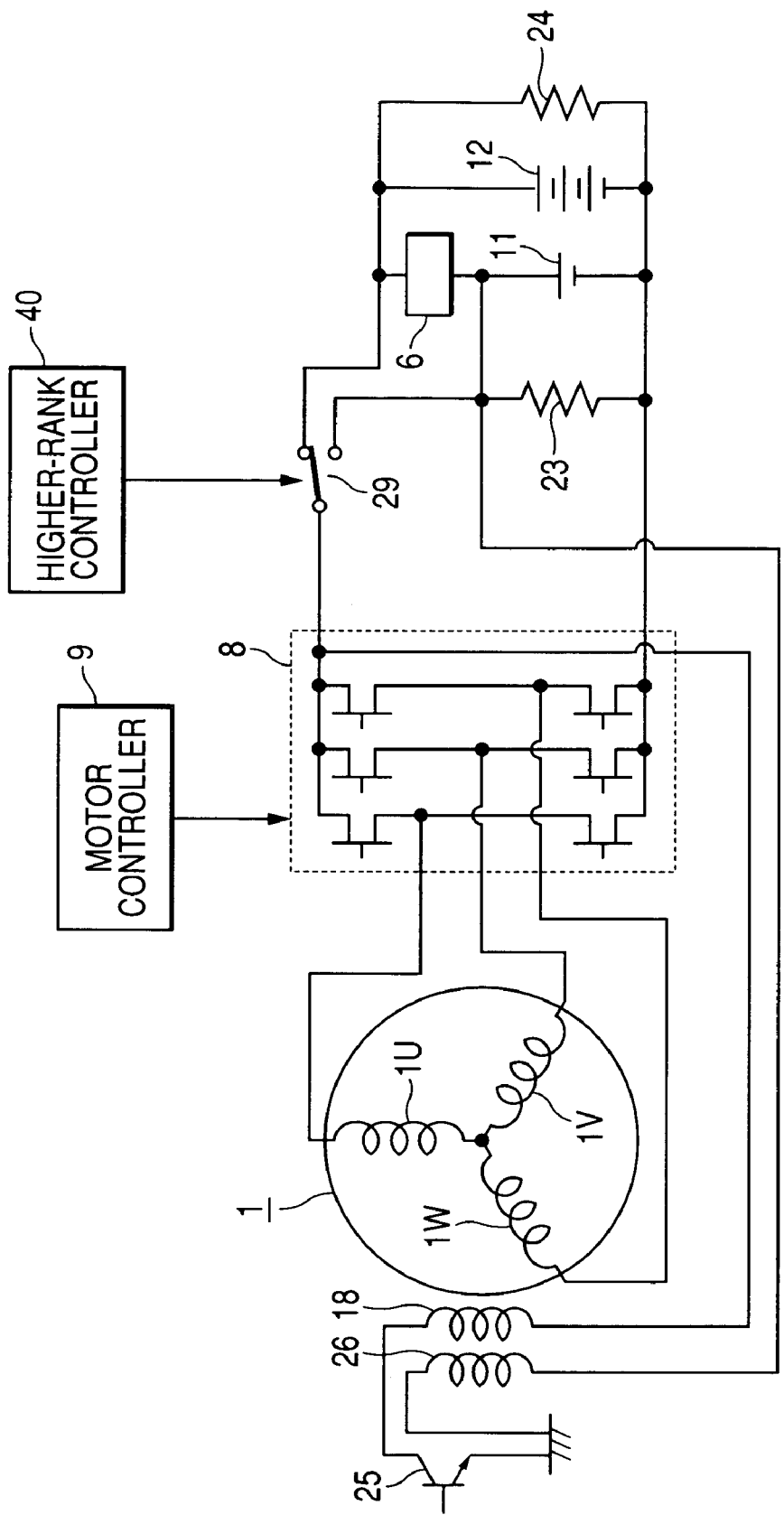
FIG. 12 is a block diagram that shows configuration of a power supply system for vehicle according to a fourth embodiment of the present invention.

FIG. 12 is a block diagram that shows configuration of a power supply system for vehicle according to a fourth embodiment of the present invention. Items are identical to those in FIGS. 1 and 2 when the same alphanumeric characters are assigned.

In this embodiment, a motor generator 1 has an alternative field coil 26 in addition to a normal field coil 18. Since the alternative field coil 26 does not have a switch similar to a switch 25 of the field coil 18, it is not easy to break. The present invention can be applied to this configuration.

In this embodiment, an alternative field coil 26 is provided, and power is supplied to the alternative field coil 26 from the 12-V battery and at least weak magnetic field's magnetic flux is supplied. The alternative field coil 26 is connected to the 12-V battery 11 and has no switch failure because it does not have a switch 25. When the switch 25 malfunctions, power is generated by means of magnetic flux of the alternative field coil 26 and leakage flux of the permanent magnet, thereby charging the 12-V low-voltage battery 11.

Furthermore, because current always flows through the alternative field coil 26 without using a permanent magnet, it is possible to set the number of turns and the coil diameter of the alternative field coil so that the amount of power generated by this magnetic field's magnetic flux is the minimum amount of generating power necessary for the automobile to travel.

As previously stated, according to this embodiment, when the generator malfunctions causing current to stop flowing through the field coil, at least the 12-V battery is continuously charged. Since only the 12-V battery at least supplies minimum power that enables the vehicle to continue traveling, the vehicle can travel if an abnormality occurs and the driver can drive the vehicle to a repair shop.

Next, with reference to FIGS. 13 through 16, configuration of a power supply system for vehicle which uses a vehicle generator according to a fifth embodiment of the present invention will be explained.

First, by using FIGS. 13 and 14, configuration of a vehicle which incorporates a power supply system for vehicle according to this embodiment will be explained.

Figure 13:
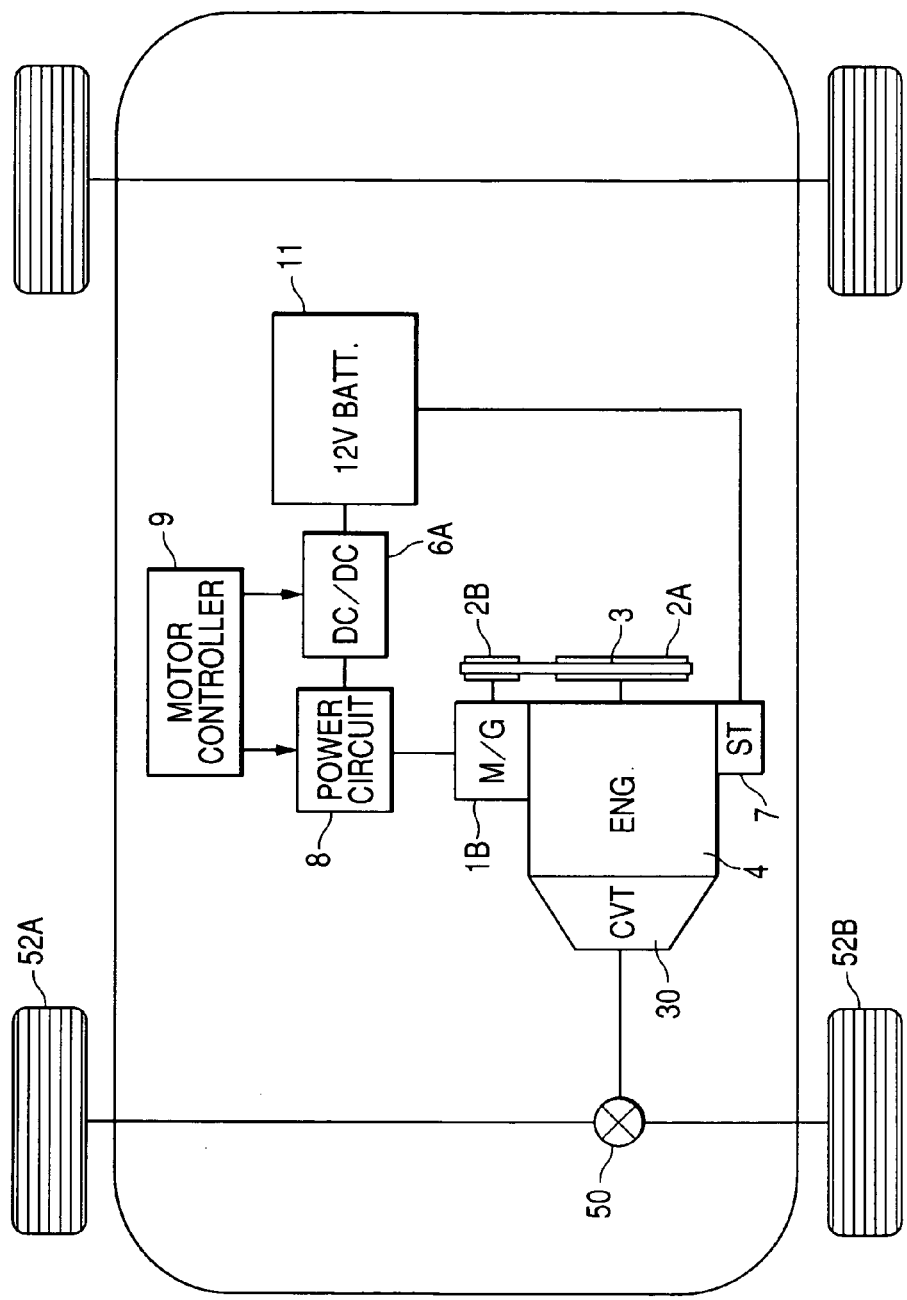
FIG. 13 is a block diagram that shows configuration of a vehicle which incorporates a power supply system for vehicle according to a fifth embodiment of the present invention.

FIG. 13 is a block diagram that shows configuration of a vehicle which incorporates a power supply system for vehicle according to a fifth embodiment of the present invention. FIG. 14 is a block diagram that shows configuration of a power supply system for vehicle which uses a vehicle generator according to a fifth embodiment of the present invention. Items are identical to those in FIGS. 1 and 2 when the same alphanumeric characters are assigned.

In FIG. 13, a motor generator 1B charges only the 12-V battery 11 and is also a motor generator which integrates a generator and an inverter in a single body. The motor generator 1B has a rotor with a permanent magnet installed.

A DC/DC converter 6A located between a power circuit 8 and a 12-V battery 11 is a voltage step-up type converter which steps-up the output voltage of the power circuit 8 and supplies it to the battery 11.

Figure 14:
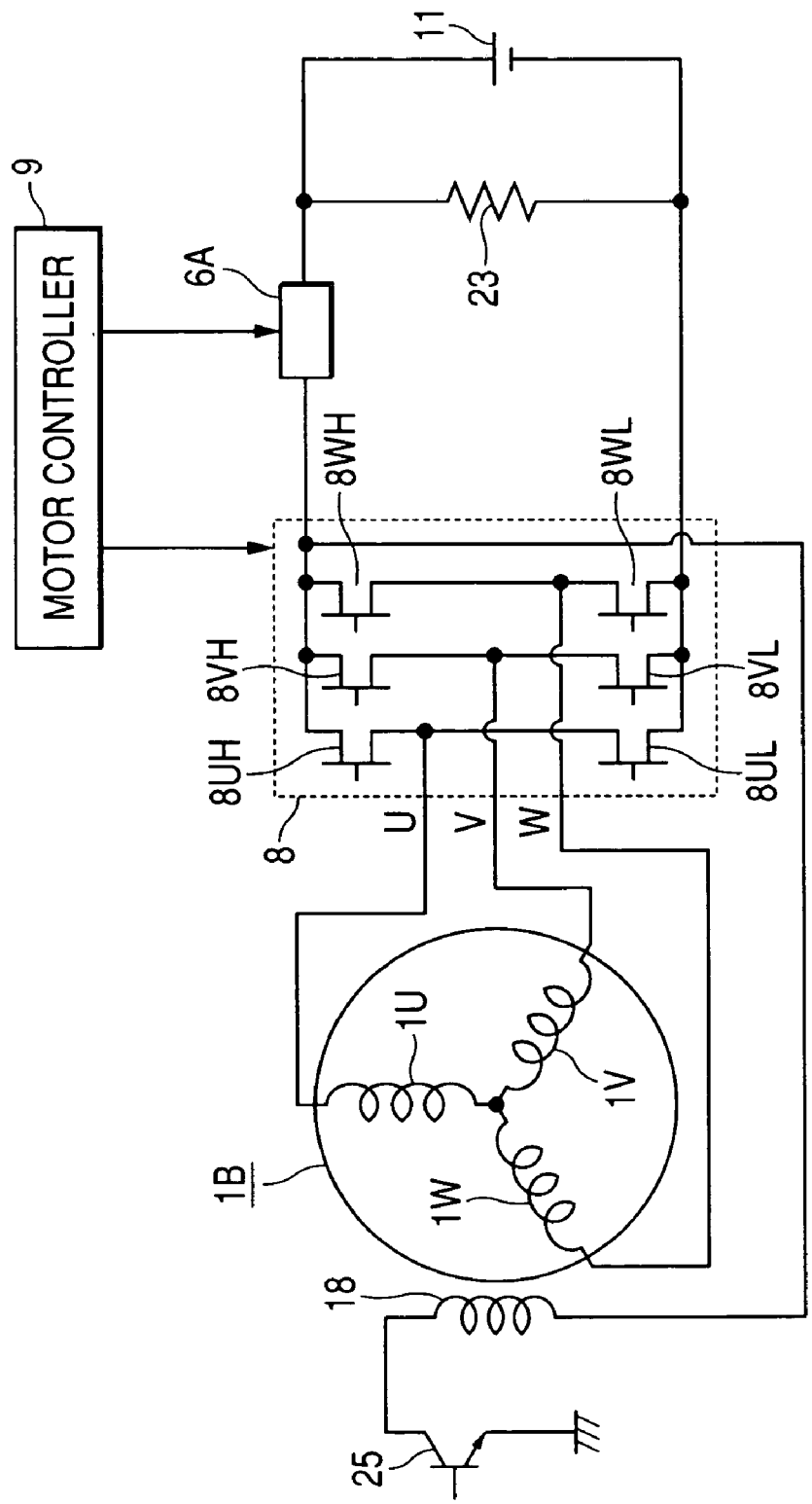
FIG. 14 is a block diagram that shows configuration of a power supply system for vehicle which uses a vehicle generator according to a fifth embodiment of the present invention.

In the configuration of FIG. 14, when a motor generator 1B is operated as a generator, the amount of generating power is adjusted by regulating current flowing through the exciting coil 18 in the same manner as an ordinary automobile generator. Or, generated current is commutated by a power circuit 8 that incorporates MOS-FETs. When the motor controller 9 issues a negative torque command to the power circuit 8, the operation mode becomes the power-generating mode.

Herein, with reference to FIG. 15, general characteristics of the generator will be explained.

Figure 15:
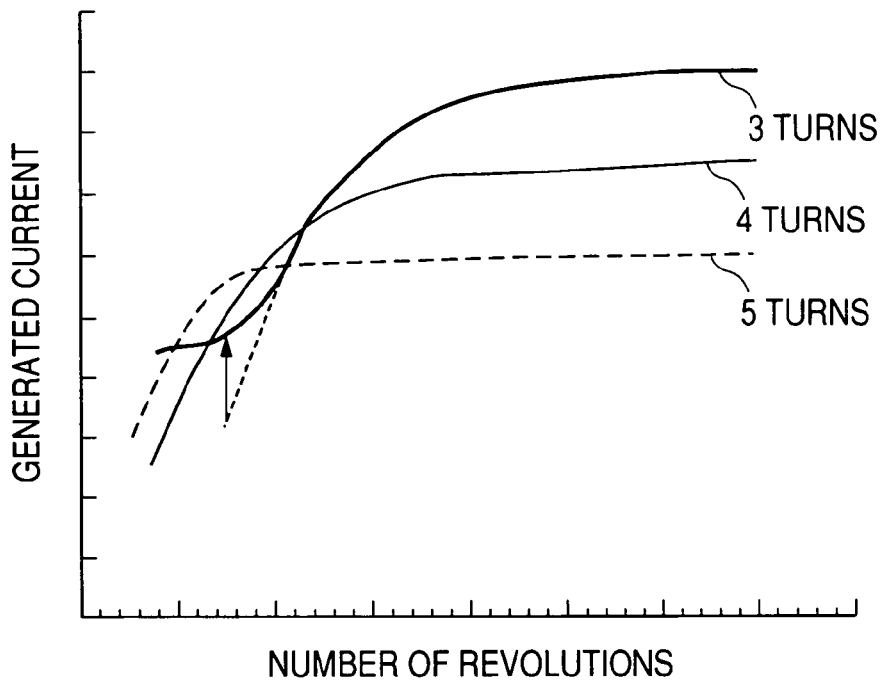
FIG. 15 is a characteristic diagram that shows general characteristics of the generator.

FIG. 15 is a characteristic diagram that shows general characteristics of the generator.

Generally, in an automobile generator, when the number of revolutions exceeds a certain number of revolutions (the number of cut-in revolutions), induced voltage exceeds the direct-current side battery voltage, thereby generating power. Because the induced voltage increases as the number of revolutions increases, the difference between battery voltage and induced voltage increases as the number of revolutions increases, thereby increasing the amount of generating power. On the other hand, the generator's impedance Z is determined by the coil's electrical resistance R and inductance L, and is generally expressed by the equation: $Z=R+j\omega L$. Herein, $\omega$ represents frequency. When the generator rotates at high speed, the value $\omega L$ increases and soon can be ignored with respect to R. Then, the increase of the number of revolutions becomes almost in proportion to the increase of impedance Z, and therefore, the amount of generating power will not increase after a certain speed.

Because the increase of the number of turns of the generator's stator coil increases the value L, the amount of generating power in a high-speed area decreases, but the number of cut-in revolutions decreases. On the contrary, reduction of the number of coils decreases the value L. Accordingly, the amount of generating power in a high-speed area increases, but the number of cut-in revolutions increases.

If the number of generator revolutions when an engine is idling is smaller than the number of cut-in revolutions, power cannot be generated. Accordingly, a certain number of turns is necessary for a vehicle generator. Because the generator must be able to generate power when the automobile is idling, the number of turns cannot be decreased below a certain number. For this reason, in conventional generators, it is difficult to increase the amount of power generated on the high speed side.

Therefore, in this embodiment, as shown in FIGS. 13 and 14, a voltage step-up type DC/DC converter 6A, which steps-up the output voltage of the power circuit 8 and charges the battery 11, is provided between the power circuit 8 and the 12-V battery 11. This configuration enables voltage to be stepped-up by a DC/DC converter 6A and supplied to the battery 11 when voltage generated by the motor generator 1B is insufficient. Accordingly, it is possible for a generator the stator coil of which does not have many turns to reduce the number of cut-in revolutions. Furthermore, because stator's turns area few, a lot of output can be obtained in a high-speed area.

Furthermore, by using a DC/DC converter 6A as a voltage step-up type converter that increases voltage from the battery to the motor generator, it is possible to increase input voltage of the power circuit 8 higher than the battery voltage. By doing so, when a motor generator 1B is driven as a motor, the input into the motor generator 1B can be increased, and the motor's output range can be increased. Increasing the output of the generator makes it possible to perform a cold start that requires a high torque of 60 Nm when an engine initially starts operation as well as performing a hot start after the engine is idling. Furthermore, it is possible to effectively provide assistance with torque to the engine in a wide range up to a high rotation area.

Furthermore, it is possible to use a power circuit 8 as a voltage step-up type converter that increases voltage from the motor generator to the battery.

Herein, with reference to FIG. 16, configuration of the voltage step-up type DC/DC converter 6A will be explained.

Figure 16:
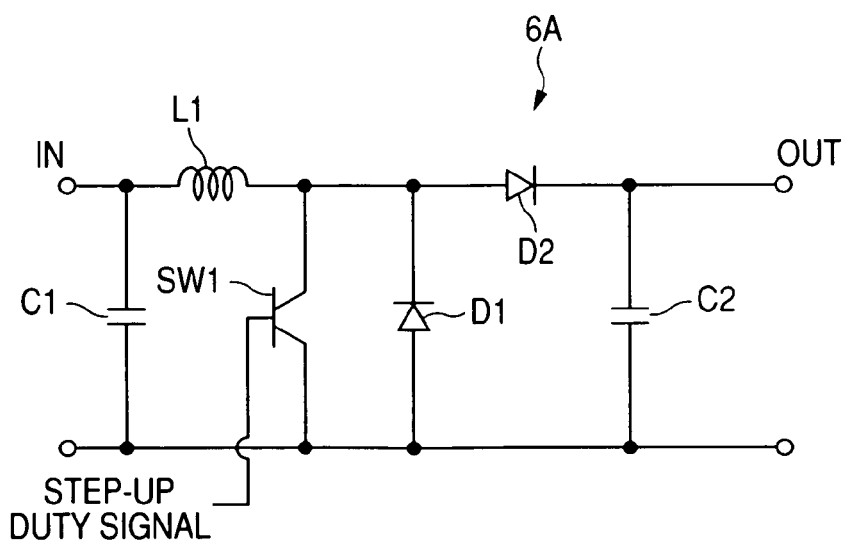
FIG. 16 is a circuit diagram that shows configuration of the voltage step-up type DC/DC converter.

FIG. 16 is a circuit diagram that shows configuration of the voltage step-up type DC/DC converter.

As shown in the figure, the voltage step-up type DC/DC converter, in which capacitors C1 and C2, a reactor L1, diodes D1 and D2 are connected to a switching element SW1, steps-up the voltage by turning on and off the switching element SW1 according to a step-up duty signal.

On the other hand, the power circuit 8 shown in FIG. 14, can also perform the same function as that of the above-mentioned voltage step-up type DC/DC converter. When comparing the voltage step-up type DC/DC converter shown in FIG. 16 with a circuit shown in FIG. 14, if the generator 1 is regarded as a reactor L1 shown in FIG. 16, MOS switching elements 8UH, 8UL, 8VH, 8VL, 8WH, and 8WL inside the power circuit 8 can perform the same function as that of switching element SW1 and diodes D1 and D2 located in the DC/DC converter. This is the operating condition when a negative torque command is issued to the generator. Specifically, because diodes are connected in parallel between the source and the drain of the MOS switching element 8UH when MOS switching elements 8VH, 8VL, 8WH, and 8WL are turned off, if the gate signal of the MOS switching element 8UH is turned off, the MOS switching element 8UH becomes equivalent to diode D2 shown in FIG. 16. Therefore, the MOS switching element 8UL becomes equivalent to the switching element SW1 in FIG. 16, and by inputting a step-up duty signal to the gate of the MOS switching element 8UL, voltage can be stepped-up by the power circuit 8. Since the motor generator 1B is actually rotating, it is necessary to input step-up duty signals to the gates of the MOS switching elements 8UL, 8VL, and 8WL according to the rotation by sequentially switching the gates.

Thus, by using a power circuit 8 as a voltage step-up circuit, among the generator's power generation characteristics shown in FIG. 15, power can be generated in a low-speed area even if the number of turns of the stator is, for example, three which is smaller than that of a conventional stator with 4 or 5 turns. This means that the power circuit 8 can steps-up voltage in a low-speed area. Thus, as shown in FIG. 15, it is possible to generate a large amount of power in a high-speed area. Accordingly, it is also possible to provide a generator that can generate high output when speed is low, for example, during idling.

Because the motor generator 1B of this embodiment uses a permanent magnet's leakage flux, if a switching element that controls field coil current malfunctions in the open state, it is possible to increase voltage of the generator by using a DC/DC converter or an inverter, thereby enabling the vehicle to continue traveling.

What is claimed is:

1. A power supply system for a vehicle
    an A.C. generator having a rotor equipped with a permanent magnet and a field coil;
    a high-voltage battery that has an electrical connection with the A.C. generator and is charged by the A.C generator;
    a low-voltage battery the voltage of which is lower than that of said high-voltage battery;
    a DC/DC converter that steps down the voltage of said high-voltage battery and supplies the lowered voltage to said low-voltage battery; and
    a control means for charging said low-voltage battery with the electric power generated through said permanent magnet in said A.C. generator when said field coil is not energized, wherein
    said A.C. generator comprises: a claw-pole type rotor; and
    the permanent magnets located between the claws of a pair of rotor yokes opposite each other, wherein
    the area S1 of the rotor yoke winded said field coil is smaller than the area S3 of the base of the claws of said rotor yoke (S1<S3).

2. A power supply system for a vehicle, comprising an A.C. generator having a rotor equipped with a permanent magnet and a field coil;
    a high-voltage battery that has an electrical connection with the A.C. generator and is charged by the A.C generator;
    a low-voltage battery the voltage of which is lower than that of said high-voltage battery;
    a DC/DC converter that steps down the voltage of said high-voltage battery and supplies the lowered voltage to said low-voltage battery; and
    a control means for charging said low-voltage battery with the electric power generated through said permanent magnet in said A.C. generator when said field coil is not energized, wherein said A.C. generator comprises:
    a claw-pole type rotor; and
    the permanent magnets located at the base of claws of rotor yoke.

3. A power supply system for a vehicle, comprising an A.C. generator having a rotor equipped with a permanent magnet and a field coil;
    a high-voltage battery that has an electrical connection with the A.C. generator and is charged by the A.C generator;
    a low-voltage battery the voltage of which is lower than that of said high-voltage battery;
    a DC/DC converter that steps down the voltage of said high-voltage battery and supplies the lowered voltage to said low-voltage battery; and
    a control means for charging said low-voltage battery with the electric power generated through said permanent magnet in said A.C. generator when said field coil is not energized, wherein
    the area S1 of the rotor yoke winded said field coil is smaller than the area S3 of the base of the claws of said rotor yoke (S1<S3).

4. A power supply system for a vehicle comprising an A.C. generator having a rotor equipped with a permanent magnet and a field coil;
    a high-voltage battery that has an electrical connection with the A.C. generator and is chawed by the A.C generator;
    a low-voltage battery the voltage of which is lower than that of said high-voltage battery;
    a DC/DC converter that steps down the voltage of said high-voltage battery and supplies the lowered voltage to said low-voltage battery; and
    a control means for charging said low-voltage battery with the electric power generated through said permanent magnet in said A.C. generator when said field coil is not energized, wherein
    when said field coil is not energized, said control means reduces the gear ratio of the transmission that changes the rotational driving force generated by an engine which drives said A.C. generator, and revs up the engine.

5. A power supply system for a vehicle comprising an A.C. generator having a rotor equipped with a permanent magnet and a field coil;
- a high-voltage battery that has an electrical connection with the A.C. generator and is charged by the A.C generator;
- a low-voltage battery the voltage of which is lower than that of said high-voltage battery;
- a DC/DC converter that steps down the voltage of said high-voltage battery and supplies the lowered voltage to said low-voltage battery; and
- a control means for charging said low-voltage battery with the electric power generated through said permanent magnet in said A.C. generator when said field coil is not energized, wherein
- said A.C. generator comprises an alternative field coil to which electric power is supplied from said low-voltage battery, and said control means charges said low-voltage battery with the electric power generated through said permanent magnet and said alternative field coil in said A.C. generator when said field coil is not energized.

6. A power supply system for a vehicle as defined in claim 1, wherein
when said field coil is not energized, said control means reduces the gear ratio of the transmission that changes the rotational driving force generated by an engine which drives said A.C. generator, and revs up the engine.

7. A power supply for a vehicle as defined in claim 3, wherein said A.C. generator comprises:
- a claw-pole type rotor; and
- the permanent magnets located at the base of claws of rotor yoke.

8. A power supply system for a vehicle as defined in claim 7, wherein
when said field coil is not energized, said control means reduces the gear ratio of the transmission that changes the rotational driving force generated by an engine which drives said A.C. generator, and revs up the engine.

9. A power supply system for a vehicle as defined in claim 5, wherein
when said field coil is not energized, said control means reduces the gear ratio of the transmission that changes the rotational driving force generated by an engine which drives said A.C. generator, and revs up the engine.

10. A power supply system for a vehicle according to claim 1, wherein
said A.C. generator comprises an alternative field coil to which electric power is supplied from said low-voltage battery, and said control means charges said low-voltage battery with the electric power generated through said permanent magnet and said alternative field coil in said A.C. generator when said field coil is not energized.

11. A power supply system for a vehicle according to claim 6, wherein
said A.C. generator comprises an alternative field coil to which electric power is supplied from said low-voltage battery, and said control means charges said low-voltage battery with the electric power generated through said permanent magnet and said alternative field coil in said A.C. generator when said field coil is not energized.

12. A power supply system for a vehicle according to claim 7, wherein
said A.C. generator comprises an alternative field coil to which electric power is supplied from said low-voltage battery, and said control means charges said low-voltage battery with the electric power generated through said permanent magnet and said alternative field coil in said A.C. generator when said field coil is not energized.

* * * * *